(12) United States Patent
Kuo (10) Patent No.: US 7,089,434 B2
(45) Date of Patent: Aug. 8, 2006

(54) WIRELESS SIGNAL RECEIVING DEVICE WITH PROMPT WAKE-UP FUNCTION

(75) Inventor: Chin-Cheng Kuo, Keelung (TW)

(73) Assignee: Lite-On Technology Corporation, Taipei (TW)

( * ) Notice: Subject to any disclaimer, the term of this patent is extended or adjusted under 35 U.S.C. 154(b) by 439 days.

(21) Appl. No.: 10/702,594

(22) Filed: Nov. 7, 2003

(65) Prior Publication Data

US 2004/0266386 A1    Dec. 30, 2004

(30) Foreign Application Priority Data

Jun. 24, 2003    (TW) .............................. 92117103 A (51) Int. Cl.
*H04B 1/38* (2006.01)
*H04B 1/16* (2006.01)
*H04M 1/00* (2006.01)

(52) U.S. Cl. ................... 713/300; 455/343.2; 455/574; 713/323

(58) Field of Classification Search ................ 455/574, 455/343.1, 343.2; 713/300, 320, 323
See application file for complete search history.

(56) References Cited

U.S. PATENT DOCUMENTS

| 6,603,744 | B1* | 8/2003 | Mizutani et al. ............. 370/310 |
| 2001/0027530 | A1* | 10/2001 | Yen et al. .................... 713/300 |
| 2002/0062197 | A1* | 5/2002 | Parrott et al. ................. 702/57 |
| 2003/0014676 | A1* | 1/2003 | Wang et al. ................. 713/323 |
| 2003/0198196 | A1* | 10/2003 | Bahl et al. ................... 370/311 |
| 2006/0030374 | A1* | 2/2006 | Ranta .......................... 455/574 |

* cited by examiner

*Primary Examiner*—Simon Nguyen
(74) *Attorney, Agent, or Firm*—Birch, Stewart, Kolash & Birch, LLP (57) ABSTRACT

A wireless signal receiving device with prompt wake-up function is disclosed for receiving serial data transmitted from computer peripherals. The device includes a RF signal receiving module, a bridge module and a USB module, which can operate in normal mode, first idle mode, second idle mode or search mode. When the device is in the first idle mode, it still receives serial data normally. When the device is in the second idle mode, the device can change to the search mode periodically to search whether there is new transmitted data. The main drawback of not being promptly waken up when the conventional wireless signal receiving device is in idle mode is improved through the disclosed device and the two idle modes.

16 Claims, 6 Drawing Sheets

WIRELESS SIGNAL RECEIVING DEVICE WITH PROMPT WAKE-UP FUNCTION

This Nonprovisional application claims priority under 35 U.S.C. § 119(a) on Patent Application No(s). 092117103 filed in TAIWAN on Jun. 24, 2003, the entire contents of which are hereby incorporated by reference.

BACKGROUND OF THE INVENTION

1. Field of Invention

The invention relates to a wireless signal-receiving device, and more particularly to a wireless signal-receiving device applied in a computer peripheral, which is connected to a computer system through a Universal Series Bus. The wireless signal receiving device can be waked up quickly to receive a data package from a computer peripheral when the device is in an idle mode.

2. Related Art

The Universal Series Bus (USB) is a standard established by USBIF (USB Implement Forum) which is composed of Compaq, Digital, IBM, Intel, Microsoft, NEC, and Nortel in 1995. The current specification is USB v2.0 edition for high-speed transmission bandwidth.

The USB interface is introduced to solve the problems of chaotic interfaces in computer systems. Therefore, the main purpose of the USB interface is to integrate the external interfaces to achieve easy use. Most of the computer peripherals, e.g., mice, keyboards, printers or scanners, adopt the USB interface to communicate with computers.

The conventional peripherals have adopted wireless technology to solve the problem of mass circuitry of the peripherals. Take a keyboard for example. A radio frequency (FR) transmitting device is established in the keyboard, and a RF signal receiving device is provided correspondingly. The RF signal-receiving device connects to the computer system via a USB interface. When a user presses keys, the RF transmitting device then transmits data packages, which are received by the RF receiving device. The computer then executes corresponding operations.

However, the USB has a rigid requirement on power management. When the FR does not transmit data, it enters to power saving mode (or idle mode). For some peripherals with low transmission speed, the power consumption has to be lower than 0.5 mA. Therefore, for the RF transmitting or receiving devices applied in mice or keyboards, owing to the high power consumption of USB control chips and RF modules, when the derives enter to power saving mode (or sleep mode, idle mode), they can not be woken up promptly until users press keys or move mouse continuously for seconds. In other cases, users have to press a special key on the receiving device to wake up the device. These circumstances are very inconvenient for users.

A power saving mode and prompt wake-up could not be realized simultaneously in prior technology. The main reason was that the USB chips needed 20 mA to 30 mA of current at least in the operation status. Once the chip entered to the idle mode, it took longer time to wake up the device. Therefore, a prompt wake-up function is not provided in most of the conventional products. For improving the function of these products, a wireless signal-receiving device with a prompt wake-up function is necessary.

SUMMARY OF THE INVENTION

The main object of in invention is to provide a wireless signal-receiving device with a prompt wake-up function to solve disadvantages and drawbacks in conventional technology.

To achieve the above object, the disclosed wireless signal receiving device with a prompt wake-up function comprises a RF signal receiving module, a bridge module and a USB module. The bridge module is coupled with the RF signal receiving module, while the USB module couples with bridge module and connects with the USB port of the computer system via a USB data line for transmitting data packages to the computer system.

The disclosed wireless signal receiving device has four operation modes, which are a normal mode, a first idle mode, a second idle mode and a search mode. The RF signal receiving module, the bridge module and the USB module are running and receiving and transmitting data in normal mode.

After a first idle counting-period, and the USB module does not receive a new data package, the USB module enters to the first idle mode. Meanwhile, the RF signal receiving module and the bridge module are still receiving data while the USB module is in first idle mode.

After a second idle counting period, and the RF signal receiving module does not receive new serial data, the device enters to the second idle mode. Meanwhile, the bridge module enters to the second idle mode, and the RF signal receiving module turns off. The receiving module turns on again after a monitor period to search whether there are new serial data. When the second idle counting period is over and the receiving module does not receive new serial data, the receiving module turns off again and the monitor period starts.

There are only a USB module and a RF signal-receiving module in most of the conventional wireless signal receiving devices. Once the device switches to idle mode, it can not be woken up quickly to receive serial data from computer peripherals. This is because the current consumption of the USB mode in normal mode is much higher than that in idle mode such that the prompt wake-up is difficult to achieve.

Therefore, a bridge is disclosed in the device so that when the USB module enters to idle-mode, the device still searches whether there are new data sent from computer peripherals periodically. Once there are new data sent out, the USB module activates immediately and transmits the data to the computer system. Any operation delay owing to entering to idle mode does not occur under user's operation.

Corresponding to the main object of the invention, the main advantage of the invention is prompt wake-up of the wireless signal receiving device. In power saving mode, the device conforms to the specification of USB low power consumption and has the ability of prompt wake-up Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given in the illustration below only, and thus are not limitative of the present invention, and wherein.

DETAILED DESCRIPTION OF THE INVENTION

Figure 1:
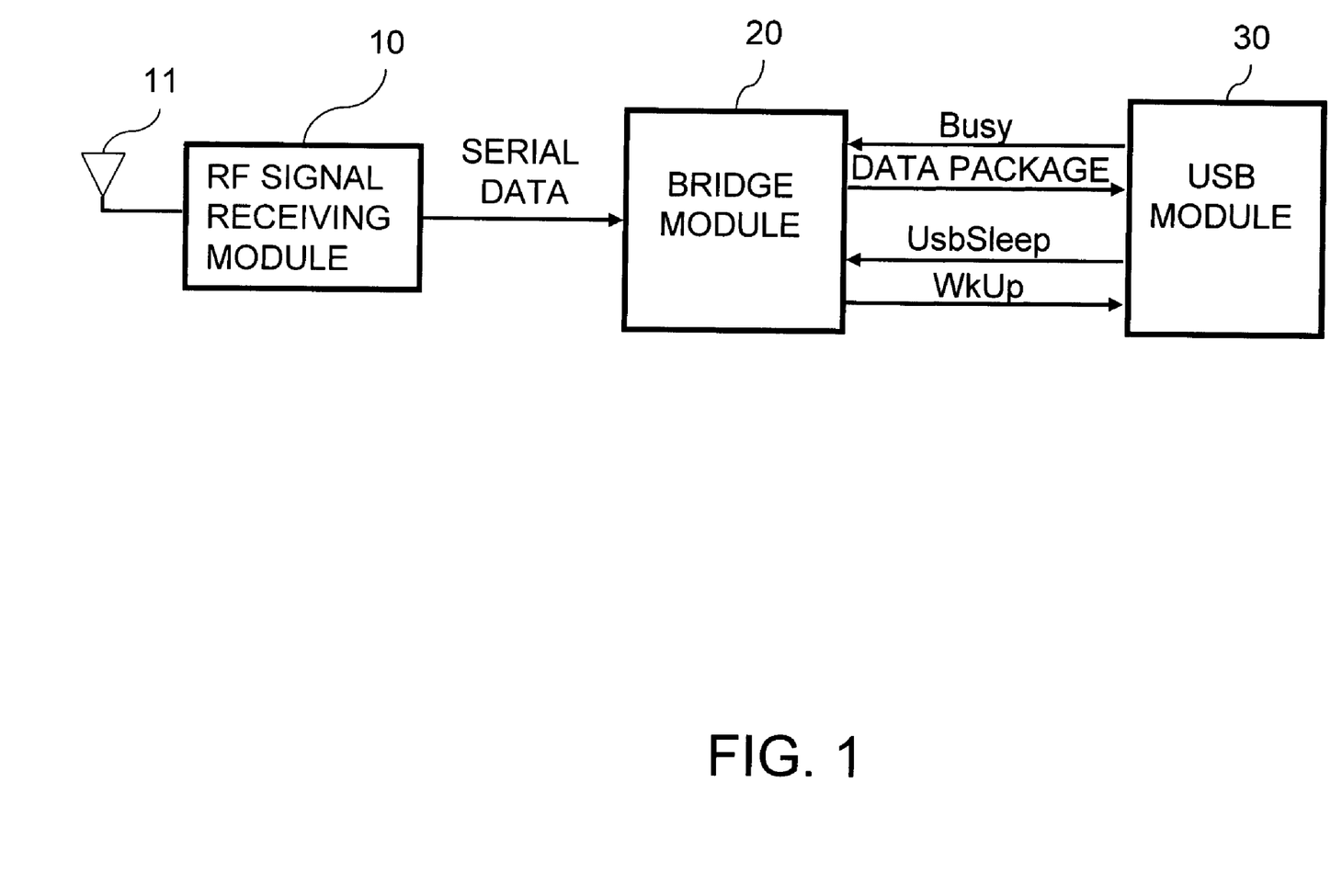
FIG. 1 is the system block diagram of the wireless signal-receiving device, with prompt wake-up, of the invention.

FIG. 1 illustrates the system block diagram of the wireless signal receiving device, with prompt wake-up, of the invention, which comprises three modules which are an RF signal receiving module 10, a bridge module 20 and a USB module 30 respectively. The bridge module 20 couples with the RF signal receiving module 10. The USB module 30 couples with the bridge module 20 and connects to the USB port of a computer system through a USB data bus, thereby forming a data-transmitting loop for delivering data packages to the connected computer system. Furthermore, the USB module 30 can connect either LED (not shown in the figure) to show relative information, or EEPROM (not shown in the figure) for storing relating software.

The RF signal-receiving module 10 has an antenna 11 for receiving an RF signal. The RF signal-receiving module 10 mainly receives serial data transmitted from computer peripherals (e.g., mouse or keyboard), which data are carried by the RF signal.

The bridge module 20 executes three operations. The first operation is to control the on-off status of the RF signal-receiving module 10 in order to meet the operation current of USB in power saving mode. The second operation is to read the RF signal carrying the serial data received by the RF signal receiving module 10 and to filter the necessary burst bits. The last is to transmit the filleted serial data to the USB module 30 to a package-type. The bridge module 20 transmits a wake up signal WkUp to the USB module 30 when receiving complete data packages.

The preferred embodiment of the bridge module 20 is an IC which has a watch dog timer at least and whose operation current is similar with that of USB devices switching to power save mode. The current is less than 1 mA approximately and much less than the operation current of the USB module 30 so that the device still operates normally when switching to the power saving mode.

The preferred embodiment of the USB module 30 is an IC which can be a USB interface controller for receiving the data packages from the bridge module 20 and transmit them to the computer system. When the USB module 30 is busy, the USB module 30 issues a busy signal 'Busy' to the bridge module 20 so that the bridge module 20 can store the data packages temporarily. The USB module 30 issues a first idle signal UsbSleep to the bridge module when in idle mode so that the second idle counter in the bridge module 20 commences counting.

There are four operation mode implemented in the disclosed wireless signal receiving device with prompt wake-up, thereby conforming the requirement of low current consumption. The four operation modes are: normal mode, first idle mode, second idle mode and search mode. When the device is in normal mode, all the modules turn on and receive and transmit data normally. The first idle mode means that the USB module 30 enters to the idle mode, while the second idle mode means that the bridge module 20 enters to idle mode. The search mode means that after a monitor period the bridge module 20 turns on to search whether there is any new RF signal when being in the second idle mode.

The power saving mode, sleep mode or idle mode mentioned in the following paragraphs are the same. That is the low current consumption which is less than 0.5 mA regulated in the USB specification.

Figure 2:
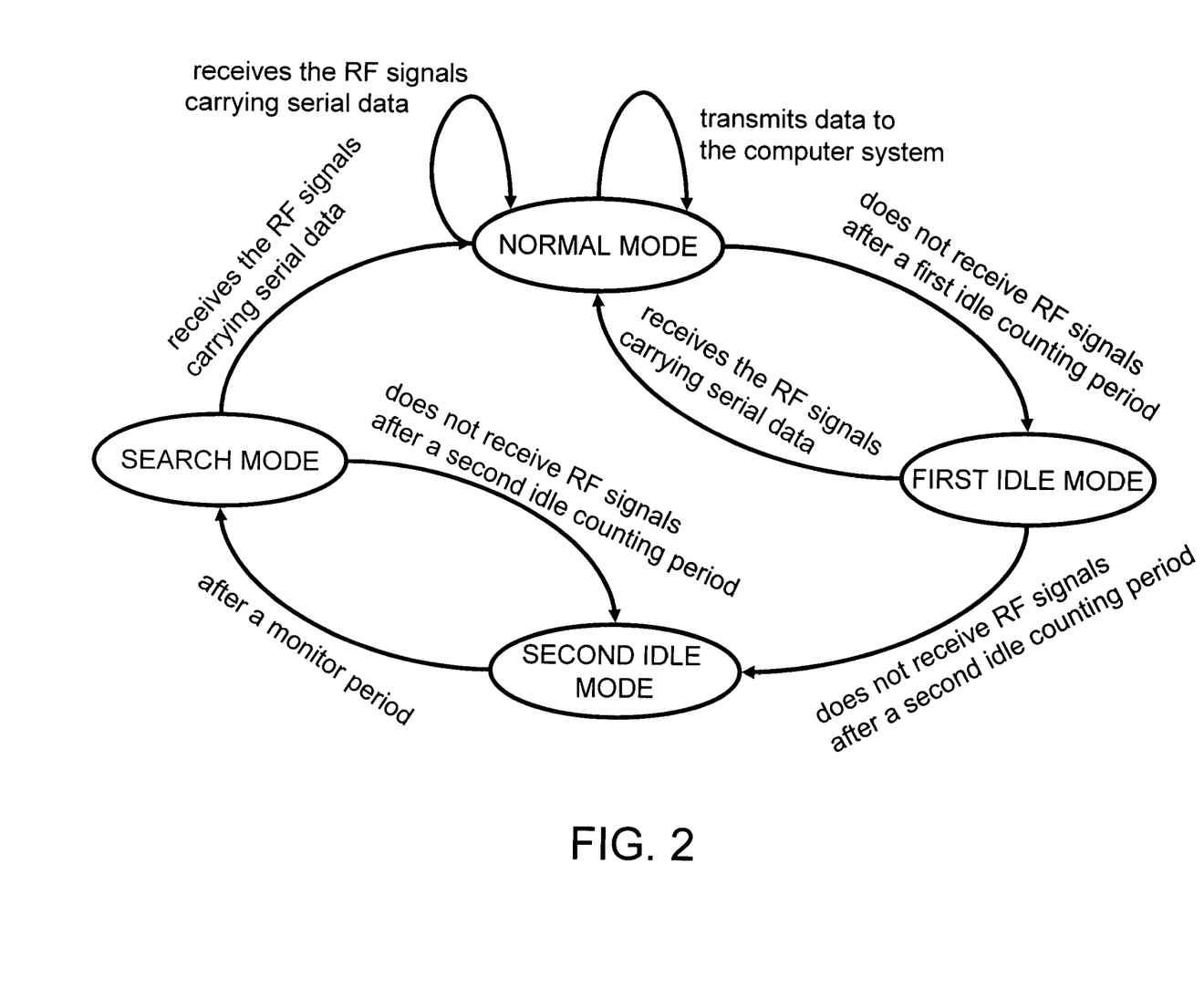
FIG. 2 is the state transfer diagram of the wireless signal-receiving device, with prompt wake-up, of the invention.

The status transfer diagram of the four modes is illustrated in FIG. 2. The details are described as follows.

When the device is in normal mode, the RF signal receiving mode 10, the bridge module 20 and the USB module 30 turn on. Meanwhile, a first idle counter begins counting.

When the device is in first idle mode, the RF signal-receiving mode 10 and the bridge module 20 turn on while the USB module 30 switches to idle mode. Meanwhile a second idle counter begins counting.

When the device is in the second idle mode, the RF signal receiving module 10 turns off, and the bridge module 20 and the USB module 30 enter to idle mode. In the interim, watch dog timer starts counting.

When the device is in search mode, the RF signal receiving module 10 and the bridge module 20 turn on while the USB module 30 is in idle mode.

When the wireless signal receiving device is in normal mode and receives the RF signals carrying serial data, the burst bits in the RF signals are then filtered and delivered to the computer system in data package type. Besides, the status of the other two modes also changes when the device receives the RF signals carrying serial data. One status transfer is from the search mode to the normal mode, and the other is from the first mode to the normal mode.

When the wireless signal receiving device is in normal mode and does not receive any complete data packages after a first idle counting period, the status changes from normal mode to first idle mode. In the interim, the second idle counter begins counting. When the device is in the first idle mode and is not receiving any serial data after a second idle counting period, the status changes from first idle mode to the second idle mode.

When the device is in the second idle mode and after a monitor period, the device changes to search mode. When the device does not receive any serial data after a second idle counting period, the device returns to second idle mode.

The disclosed wireless signal device with a prompt wake-up function can monitor periodically whether there is new RF signal to be received through a bridge module, whose current consumption is much less than that of the USB module when the USB module is in idle mode. When there are data to be received, the USB module can be waken up quickly in order to deliver the received data to the computer system.

Therefore, the bridge module 20 mainly controls the on-off state of the RF signal receiving module 10 and receives the RF signals from the receiving module 10. Then, the burst bits are filtered and transmitted to the USB module 30 in data package form. When the USB module 30 is in the first idle mode, the received data are stored. After receiving new data, the USB module 30 is woken up. When the device does not receive data for a period of time, the RF signal receiving module 10 is turned off by the bridge module and switches to the second idle mode. When being in the second idle mode, after a monitor period, the device switches to search mode and the RF signal-receiving module 10 is activated again to assure if there are new data. In the interim, when finding new data, the disclosed device returns back to normal mode and issues a wake up signal to the USB module 30. The USB module 30 then turns on to transmit the received data to the computer system. When in the second idle mode, the duty cycle of the monitor period makes the least average current of the signal receiving device conform the USB specification, in which the current equals to 0.5 mA.

Figure 3A:
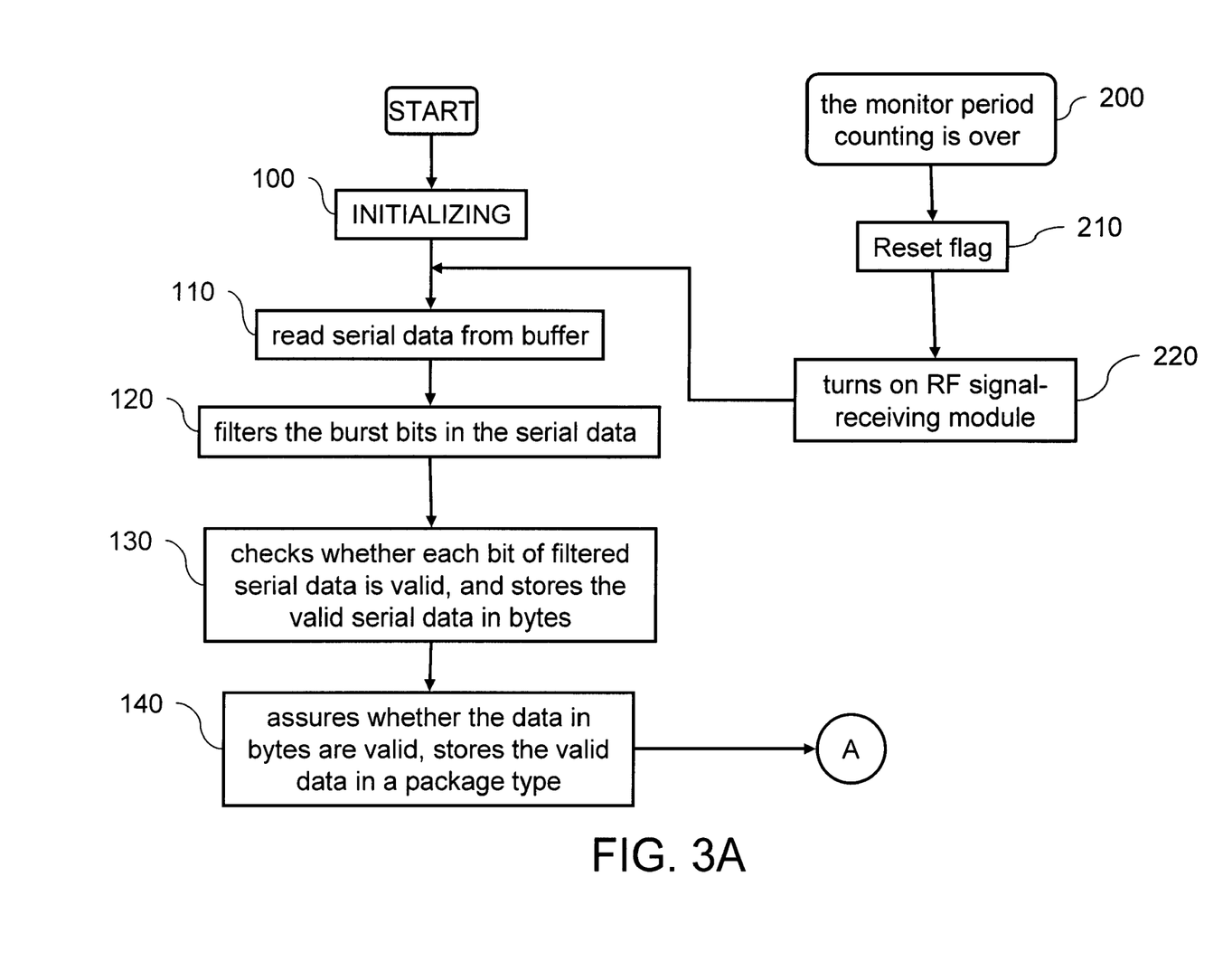
FIG. 3A~FIG. 3B are the flow chart of the bridge module of the wireless signal receiving device, with prompt wake-up, of the invention.
Figure 3B:
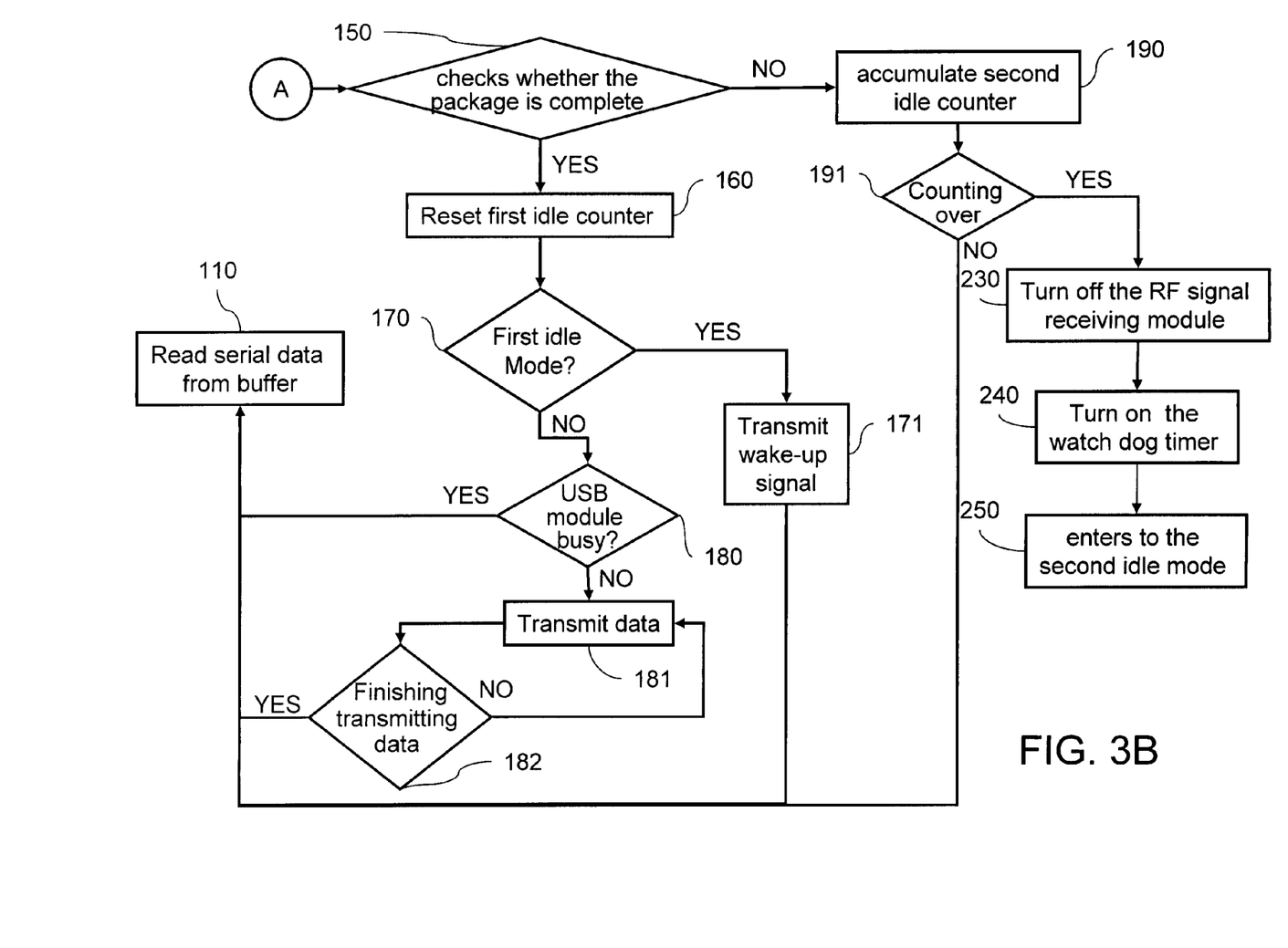

FIG. 3A~FIG. 3B are the flow chart of the bridge module of the wireless signal receiving device with prompt wake-up of the invention. The operation is executed by the software stored in the bridge module 20.

After the bridge module is initialized (Step 100), the flow goes to buffer to read serial data (Step 110) and filters the burst bits in the serial data (step 120). After filtering the burst bits, the flow checks whether each bit of filtered serial data is valid, and stores the valid serial data in bytes (Step 130).

The bridge module 20 has a watch dog timer. When the monitor period counting is over (Step 200) and the flag is reset (Step 210), the RF signal-receiving module 10 turns on, to receive RF signals (Step 220) and switches to buffer to read serial data (Step 110).

Then the flow assures whether the data in bytes are valid, stores the valid data in a package type (Step 140), and checks whether the package is complete (step 150). The first idle counter is reset (Step 160). The preparation for data package transmission is finished.

Before transmitting the data, the flow checks whether the USB module 30 switches to the first idle mode (Step 170). If switching to the first idle mode, the bridge module 20 issues a wake up signal to the USB module 30 to wake up the USB module (Step 171). Before the USB module 30 is ready to receive data, the bridge module 20 reads serial data from buffer continuously.

If the USB module does not switch to the first idle mode, the flow checks whether the USB module is busy (Step 180). If being busy, the bridge module 20 reads serial data from the buffer continuously (Step 110). If not being busy, then the bridge module 20 transmits data to the USB module (Step 181). Finishing transmitting data (Step 182), the bridge module 20 reads serial data from the buffer continuously (Step 110).

In Step 150, the second idle counter accumulates if the data package is not complete (Step 190), and the flow checks whether counting of switching to the second idle mode is achieved (step 191). If the counting is not over, the bridge module 20 reads serial data from the buffer continuously. If achieving the counting, the RF signal receiving module is turned off (Step 230) and the watch dog timer activated (Step 240). The bridge module enters to the second idle mode (Step 250).

Figure 4:
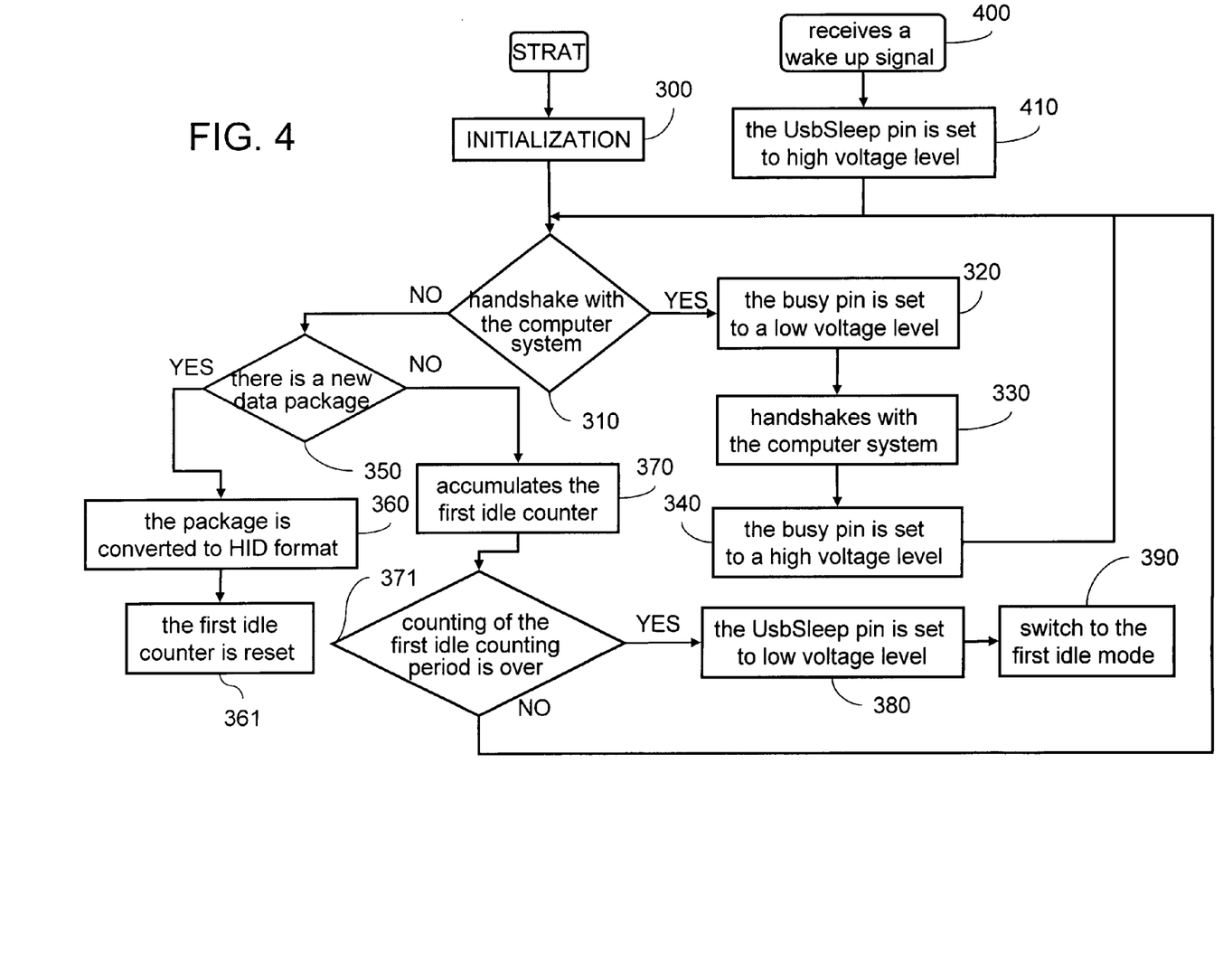
FIG. 4 is the flow chart of the USB module of the wireless signal receiving device, with prompt wake-up, of the invention.

The USB module mainly receives a data package from the bridge module 20 and transmits to the computer system. After the first idle counting-period, and the USB module does not receive adata package, the module enters to the first idle mode and transmits a first idle signal UsbSleep to inform the bridge module 20 of switch to the first idle mode. Reception of the wake up signal Wkup is triggered by interruption, then the device switches to normal mode.

FIG. 4 is the flow chart of the USB module of the wireless signal receiving device with prompt wake-up of the invention. After initializing the USB module (step 300), the USB module 30 checks whether to handshake with the computer system (Step 310). If necessary, the busy pin of the USB module 30 is set to a low voltage level (Step 320), which means that the USB module 30 is busy currently. Then the USB module handshakes with the computer system (Step 330). After finishing handshaking with the computer system, the busy pin of the USB module 30 is set to a high voltage level (Step 340).

In Step 310, if the USB module 30 doesn't need to handshake with the computer system, the USB module 30 checks if there is a new data package (Step 350). If there is a new data package, the package is converted to HID format (Step 360), and the first idle counter is reset (Step 361). When the first idle counter counts to the first idle counting period, the USB module enters to the first idle mode, which is in low current consumption status. When performing Step 350, if the USB module 30 does not receive a new data package, the first idle counter accumulates (Step 370) and the flow checks whether counting of the first idle counting period is over (Step 371). If not finished, the flow goes back to Step 310. If the first idle counting period id is finished, the UsbSleep pin of the module 30 is set to a low voltage level (Step 380). The USB module 30 is to switch to the first idle mode (Step 390).

When the USB module 30 is in the first idle more and receives a wake up signal (Step 400), the UsbSleep pin of the module 30 is set to high voltage level (Step 410) and the flow goes to Step 310.

For a low speed USB device, when entering to idle mode, the current consumption must be less than 0.5 mA. According to the embodiment of the invention, after a specific period, the wireless signal-receiving device of the invention enters to idle mode. After being in idle mode, the bridge module 20 and the RF signal-receiving module 10 search whether there are new serial data periodically. Once receiving a valid data package, the device stores the data package and wakes up the USB module 30. After the USB module returns back to normal mode, the bridge module 20 delivers the received data package to the USB module 30. The calculation of the duty cycle of the second idle mode and the search mode is described as follows. It has to be noticed that the duty cycle must be conform the specification where the current consumption is less than 0.5 mA ,when the wireless signal receiving device is in idle mode.

Figure 5:
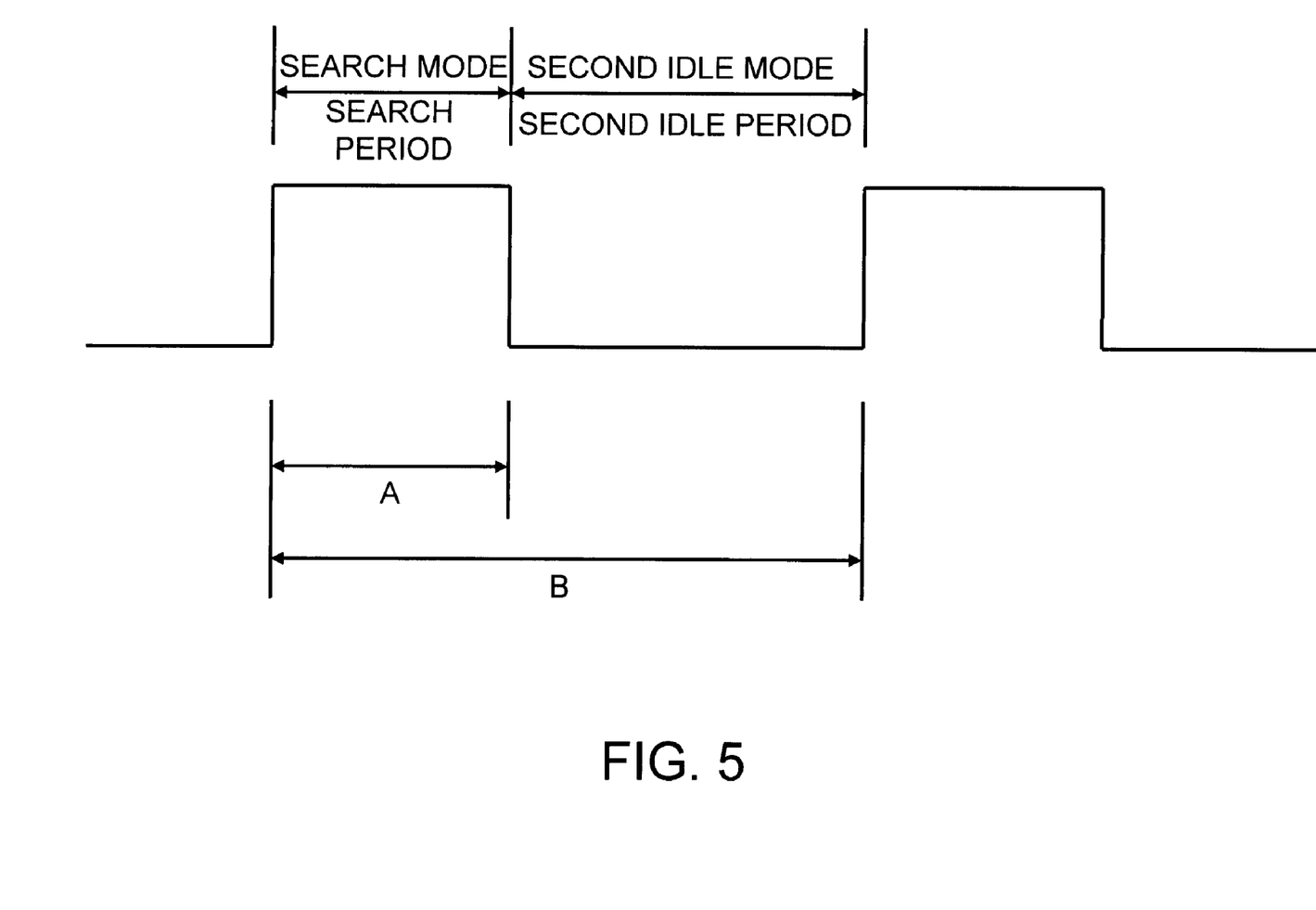
FIG. 5 is the schematic diagram of the duty cycles of the wireless signal-receiving device, with prompt wake-up, of the invention.

Refer to FIG. 5. A represents the search period of the search mode, while B represents the summation of the search period and the second idle period, which means the time that the bridge module is in.

Suppose I1 is the current consumption of the search mode, and I2 is the current consumption of the second idle mode. I1 and I2 must be conform $A*I1+(B-A)*I2=0.5*B$. A represents the search period of the search mode, while B represents the summation of the search period and the second idle period. The duty cycle is obtained as follows:

$$A/B=(0.5-I2)/(I1-I2)$$

For example, let I1=7 mA, I2=0.05 mA, then A/B=(0.5−0.05)/(7−0.05)=0.0692. For keyboards, the longest period is 80 ms. Then A equals to 80 ms. From the above equation, 1156.1 ms is obtained. If the disclosed device can receive data from a keyboard or a mouse, A can be set as 80 ms and B equals to 1.2 seconds consequently. Therefore, when the disclosed device switches to the second idle mode, the user only has to press any key or move the mouse for 1.2 seconds so that the device returns to normal mode. The disclosed device of the invention not only conforms the regulation of low current consumption, but also solves the drawback-problem, in which the receiving device can not be woken up when being in idle mode.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for promptly waking up a wireless signal receiving device, which is used to receive serial data from computer peripherals in a normal mode, the serial data being carried by RF signal and converted to data package to be transmitted to a computer system, the method comprising the steps of:
   (a) after a first idle counting period and the wireless signal receiving device does not receive any complete data package, switching to a first idle mode and starting counting of a second idle counting period;
   (b) after the second idle counting period and the wireless signal receiving device does not receive any complete data package, switching to a second idle mode and starting counting of a monitor period;
   (c) after the monitor period, switching to a search mode to search whether there is any new serial data, and restarting counting of a second idle counting period; and
   (d) when being in the search mode and receiving complete data package, transmitting a wake up signal to make the wireless signal receiving device switch to the normal mode for delivering the complete data package to the computer system.

2. The method of claim 1, wherein in the step (c) if the device does not receive any complete data package, the device switches to the second idle period after the second idle counting period.

3. A wireless signal receiving device with prompt wake-up function for receiving serial data from computer peripherals, the serial data being carried in RF signals, the device having four operation modes which are normal mode, first idle mode, second idle mode, and search mode respectively, the device comprising:
   a RF signal receiving module for receiving the RF signal carrying the serial data in the normal mode, the first idle mode and the search mode, turning off in the second idle mode, switching to the search mode after a monitor period, and turning off after a second idle counting period and receiving complete data package when being in the search mode;
   a bridge module electrically coupled with the RF signal receiving module, for receiving the RF signal carrying the serial data in the normal mode, correcting the burst bits in the RF signal and converting the corrected serial data into data package, after a second idle counting period and does not receive complete data package, switching to the second idle mode and turning off the RF signal receiving module, after a monitor period, turning on the RF signal receiving module such that the RF signal receiving module swtichs to the search mode, and after the second idle counting period, turning off the RF signal receiving module; and
   a USB module electrically coupled with the bridge module and connected to a USB port of a the computer system through a USB data bus, for receiving the data package and transmitting the data package to the computer system when being in the normal mode, and switching to the first idle mode after a first idle counting period and does not receive new data package.

4. The device of claim 3, wherein the RF signal receiving module further comprises an antenna for receiving the RF signal.

5. The device of claim 3, wherein the bridge module is an IC.

6. The device of claim 3, wherein the USB module is an IC.

7. The device of claim 3, wherein the bridge module transmits a wake up signal to the USB module to wake up the USB module when receiving a complete data package in the first idle mode or the search mode.

8. The device of claim 3, wherein the USB module transmits a first idle signal to the bridge module to inform the bridge module of switch to the first idle mode upon entering to first idle mode.

9. The device of claim 3, wherein the USB module transmits a busy signal to the bridge module when handshaking with the computer system.

10. A method for promptly waking up a wireless signal receiving device, for receiving serial data from computer peripherals, the serial data being carried in RF signals, the device having four operation modes which are normal mode, first idle mode, second idle mode, and search mode respectively, the method comprising the steps of:
    (a) receiving the RF signals carrying the serial data when the device is in the normal mode, the first idle mode or the search mode;
    (b) converting the serial data into data package;
    (c) checking whether the data package is complete;
    (d) checking the connection of the wireless signal receiving device and the computer system; and
    (e) transmitting the complete data package to the computer system according to the connection status.

11. The method of claim 10, wherein the step (a) further comprises the following steps:
    correcting the burst bits in the RF signals carrying the serial data;
    assuring whether each bit of the serial data is valid, and storing the valid bits in byte; and
    checking whether valid bits in byte are valid, and storing the valid bytes in data package type.

12. The method of claim 10, wherein in the step (c) if the data package is complete, further comprises the following steps:
    resetting counting of a first idle counting period;
    checking the operation status of the wireless signal receiving device;
    transmitting the complete data package to the computer system if the wireless signal receiving device is not in the first idle mode.

13. The method of claim 12, wherein in the step of checking the operation status, if the status is in the first idle mode, the step further comprises issuing a wake up signal thereby transmitting the data package to the computer system.

14. The method of claim 10, wherein if the data package is not complete in the step (c), further comprises the following steps of:

checking whether the second idle counting period is over; and when the second idle counting period is over, the wireless signal receiving device switching to the second idle mode and starting counting of the monitor period.

15. The method of claim 14, further comprises the step of entrance to the search mode when the counting of the monitor period is over.

16. The method of claim 10, wherein if the device needs not to handshaking with the computer system in the step (d), further comprises the steps of:

converting the complete data package into to HID format; and transmitting the converted data package.

* * * * *